United States Patent
Chan

(10) Patent No.: US 9,590,247 B2
(45) Date of Patent: Mar. 7, 2017

(54) TRANSITION METAL HYDROXY-ANION ELECTRODE MATERIALS FOR LITHIUM-ION BATTERY CATHODES

(71) Applicant: Candace Chan, Phoenix, AZ (US)

(72) Inventor: Candace Chan, Phoenix, AZ (US)

(73) Assignee: ARIZONA BOARD OF REGENTS, A BODY CORPORATE OF THE STATE OF ARIZONA ACTING FOR AND ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 134 days.

(21) Appl. No.: 14/408,870

(22) PCT Filed: Jun. 20, 2013

(86) PCT No.: PCT/US2013/046809
§ 371 (c)(1),
(2) Date: Dec. 17, 2014

(87) PCT Pub. No.: WO2013/192417
PCT Pub. Date: Dec. 27, 2013

(65) Prior Publication Data
US 2015/0188138 A1 Jul. 2, 2015

Related U.S. Application Data

(60) Provisional application No. 61/662,134, filed on Jun. 20, 2012.

(51) Int. Cl.
| | | |
|---|---|---|
| *H01M 4/13* | (2010.01) | |
| *H01M 4/58* | (2010.01) | |
| *H01M 4/00* | (2006.01) | |
| *H01M 4/42* | (2006.01) | |
| *H01M 4/136* | (2010.01) | |
| *C01B 25/37* | (2006.01) | |
| *C01G 3/10* | (2006.01) | |
| *H01M 4/1391* | (2010.01) | |
| *H01M 10/052* | (2010.01) | |
| *H01M 4/02* | (2006.01) | |

(52) U.S. Cl.
CPC ........... *H01M 4/5825* (2013.01); *C01B 25/37* (2013.01); *C01G 3/10* (2013.01); *H01M 4/136* (2013.01); *H01M 4/1391* (2013.01); *H01M 10/052* (2013.01); *H01M 2004/028* (2013.01); *Y02E 60/122* (2013.01)

(58) Field of Classification Search
CPC ........... H01M 4/48; H01M 4/50; H01M 4/52; H01M 4/5805; H01M 4/5815; H01M 10/0525
See application file for complete search history.

(56) References Cited

U.S. PATENT DOCUMENTS

| | | | |
|---|---|---|---|
| 5,310,533 A | 5/1994 | Browne | |
| 7,285,260 B2 | 10/2007 | Armand et al. | |
| 8,367,036 B2 | 2/2013 | Barker et al. | |
| 8,399,130 B2 | 3/2013 | Ceder et al. | |
| 2005/0163699 A1* | 7/2005 | Barker | H01M 4/5825 423/464 |
| 2007/0190425 A1* | 8/2007 | Barker | C01B 25/455 429/231.9 |
| 2009/0117020 A1 | 5/2009 | Manthiram et al. | |
| 2012/0037844 A1 | 2/2012 | Ceder et al. | |
| 2012/0138867 A1 | 6/2012 | Liang et al. | |
| 2016/0141605 A1 | 5/2016 | Chan et al. | |

FOREIGN PATENT DOCUMENTS

| | | |
|---|---|---|
| JP | 2005-019351 | 1/2005 |
| WO | 2013192417 | 12/2013 |
| WO | 2014205381 | 12/2014 |

OTHER PUBLICATIONS

Srichandana Nandikonda. "Microwave Assisted Synthesis of Silver Nanorods," MS Thesis. Auburn University, Aug. 9, 2010, 59 pages.
Thompson, A. H. Electrochemical potential spectroscopy: a new electrochemical measurement. Journal of the Electrochemical Society 126, 608-616 (1979).
Weppner, W. & Huggins, R. A. Determination of the kinetic parameters of mixed-conducting electrodes and application to the system Li3Sb. Journal of the Electrochemical Society 124, 1569-1578 (1977).
Novak, P. CuO cathode in lithium cells—II. Reduction mechanism of CuO. Electrochimica Acta 30, 1687-1692 (1985).
Li, T., Ai, X. P. & Yang, H. X. Reversible electrochemical conversion reaction of Li2O/CuO nanocomposites and their application as high-capacity cathode materials for Li-ion batteries. Journal of Physical Chemistry C. 115, 6167-6174 (2011).
Ceder G., Hautier G., Jain A., & Ong S.P., "Recharging lithium battery research with first-principles methods", MRS Bulletin 36, 185-191 (2011).
Whittingham, M. Stanley, Lithium Batteries and Cathode Materials, Chem. Rev., 104, 4271-4301 (2004).

(Continued)

*Primary Examiner* — Patrick Ryan
*Assistant Examiner* — Julian Anthony
(74) *Attorney, Agent, or Firm* — Fish & Richardson P.C.

(57) ABSTRACT

A transition metal hydroxy-anion electrode material for lithium-ion battery cathodes includes the charge-neutral structure $M_x(OH)_n(XO4)_m$, where M is one or more transition metals, x is the total number of transition metal atoms, X is sulfur or phosphorus, and x, n, and m are integers. $(OH)_n(XO_4)_m$ is a hydroxysulfate or hydroxyphosphate, and M can be one or more (e.g., a solid solution of) transition metals selected from the group consisting of copper, iron, manganese, nickel, vanadium, cobalt, zinc, chromium, and molybdenum. A lithium-ion battery may have a cathode including $M_x(OH)_n(XO_4)_m$ as a cathode material, and an electronic device may include a lithium-ion battery having a cathode including $M_x(OH)_n(XO_4)_m$ as a cathode material.

22 Claims, 4 Drawing Sheets

(56) References Cited

OTHER PUBLICATIONS

Xu J. & Xue D., "Fabrication of Copper Hydroxyphosphate with Complex Architectures", J. Phys. Chem. B, 110, 7750-7756 (2006).
Lee D.W., International Search Report & Written Opinion for PCT/US2013/046809, mailed Oct. 11, 2013.
Thomas S., International Search Report & Written Opinion for PCT/US14/43468, mailed Oct. 31, 2014.
Masquelier C. & Croguennec L., "Polyanionic (Phosphates, Silicates, Sulfates) Frameworks as Electrode Materials for Rechargeable Li (or Na) Batteries", Chem. Rev., 113, 6552-6591 (2013).
Andreoli E., Rooney D.A., Redington W., Gunning R., & Breslin, C.B. "Electrochemical Deposition of Hierarchical Micro/Nanostructures of Copper Hydroxysulfates on Polypyrrole-Polystyrene Sulfonate Films", J. Phys. Chem. C,115. 8725-8734 (2011).
Nadikonda S. Microwave Assisted Synthesis of Silver Nanorods. Master of Science Thesis, Auburn University, Alabama, Aug. 2010.
Ding, Y., Wen, Y., van Aken, P. A., Maier, J., and Yu, Y. Jarosite Nanosheets Fabricated via Room-Temperature Synthesis as Cathode Materials for High-Rate Lithium Ion Batteries. Chemistry of Materials. 26 pages. (2015).
Wen, C. J. & Huggins, R. A. Chemical diffusion in intermediate phases in the lithium-silicon system. Journal of Solid State Chemistry 37, 271-278 (1981).
Chan, C. K., Peng, H., Liu, G., McIlwrath, K., Zhang, X. F., Huggins, R. A. & Cui, Y. High-performance lithium battery anodes using silicon nanowires. Nature Nanotechology 3, 31-35 (Jan. 2008).
Chan, C. K. & Zhang, X. F. High capacity Li ion anodes using Ge nanowires. Nano Letters 8(1), 307-309 (2008).
Ellis, B. L., Lee, K. T. & Nazar, L. F. Positive electrode materials for Li-ion and Li-batteries. Chemistry of Materials 22 (3), 691-714 (Jan. 2010).
Arico, A. S., Bruce, P., Scrosati, B., Tarascon, J. -. & van Schalkwijk, W. Nanostructured materials for advanced energy conversion and storage devices. Nature Materials 4, 366-377 (May 2005).
Badway, F., Cosandey, F., Pereira, N. & Amatucci, G. G. Carbon Metal Fluoride Nanocomposites—High-capacity reversible metal fluoride conversion materials as rechargeable positive electrodes for Li batteries. Journal of the Electrochemical Society 150(10), A1318-A1327 (2003).
Wang, F., Robert, R., Chernova, N. A., Pereira, N., Omenya, F., Badway, F., Hua, X., Ruotolo, M., Zhang, R., Wu, L, Volkov, V., Su, D., Key, B., Whittingham, S. M., Grey, C. R, Amatucci, G. G., Zhu, Y. & Graetz, J. Conversion reaction mechanisms in lithium ion batteries: study of the binary metal fluoride electrodes. Journal of the American Chemical Society 133, 18828-18836 (Sep. 2011).
Padhi, A. K., Nanjundaswamy, K. S. & Goodenough, J. B. Phospho-olivines as positive-electrode materials for rechargeable lithium batteries. Journal of the Electrochemical Society 144(4), 1188-1194 (Apr. 1997).
Manthiram, A. Phospho-olivine cathodes for lithium-ion batteries. The Electrochemical Society Interface, 44-47 (2009).
Barker, J., Gover, R. K. B., Burns, P., Bryan, A., Saidi, M. Y. & Swoyer, J. L. Structural and electrochemical properties of lithium vanadium fluorophosphate, LiVPO4F. Journal of Power Sources 146, 516-520 (May 2005).
Ramesh, T. N., Lee, K. T., Ellis, B. L. & Nazar, L. F. Tavorite lithium iron fluorophosphate cathode materials: phase transition and electrochemistry of LiFePO4F-Li2FePO4F. Electrochemical and Solid-State Letters 13(4), A43-A47 (2010).
Recham, N., Chotard, J., Dupont, L., Delacourt, C., Walker, W., Armand, A. & Tarascon, J.- M. A 3.6 V lithium-based fluorosulphate insertion positive electrode for lithium-ion batteries. Nature Materials 9, 68-74 (Jan. 2010).
Barpanda, P., Ati, M., Melot, B. C., Rousse, G., Chotard, J., Doublet, M., Sougrati, M. T., Corr, S. A., Jumas, J. & Tarascon, J.-M. A 3.90 V iron-based fluorosulphate material for lithium-ion batteries crystallizing in the triplite structure. Nature Materials 10, 772-779 (Oct. 2011).
Nyten, A., Abouimrane, A., Armand, M., Gustafsson, T. & Thomas, J. O. Electrochemical performance of Li2FeSiO4 as a new Li-battery cathode material. Electrochemistry Communications 7, 156-160 (2005).
Gong, Z. L., Li, Y. X. & Yang, Y. Synthesis and characterization of Li2MnxFe1-xSiO4 as a cathode material for lithium-ion batteries. Electrochemical and Solid-State Letters 9(12), A542-A544 (2006).
Dominko, R., Bele, M., Gaberscek, M., Meden, A., Remskar, M. & Jamnik, J. Structure and electrochemical performance of Li2MnSiO4 and Li2FeSiO4 as potential Li-battery cathode materials. Electrochemistry Communications 8, 217-222 (2006).
Kokalj, A., Dominko, R., Mali, G., Meden, A., Gaberscek, M. & Jamnik, J. Beyond one-electron reaction in Li cathode materials: designing Li2MnxFe1-xSiO4. Chemistry of Materials 19(15), 3633-3640 (2007).
Dominko, R. Li2MSiO4 (M = Fe and/or Mn) cathode materials. Journal of Power Sources 184, 462-468 (2008).
Belharouak, I., Abouimrane, A. & Amine, K. Structural and electrochemical characterization of Li2MnSiO4 cathode material. Journal of Physical Chemistry C 113(48), 20733-20737 (2009).
Muraliganth, T., Stroukoff, K. R. & Manthiram, A. Microwave-solvothermal synthesis of nanostructured Li2MSiO4/C (M = Mn and Fe) cathodes for lithium-ion batteries. Chemistry of Materials 22(20), 5754-5761 (2010).
Kam, K. C., Gustafsson, T. & Thomas, J. O. Synthesis and electrochemical properties of nanostructured Li2FeSiO4/C cathode material for Li-ion batteries. Solid State Ionics 192, 356- 359 (2011).
Zhou, H., Upreti, S., Chernova, N. A., Hautier, G., Ceder, G. & Whittingham, M. S. Iron and manganese pyrophosphates as cathodes for lithium-ion batteries. Chemistry of Materials 23(2), 293-300 (2011).
Hautier, G., Jain, A., Ong, S. P., Kang, B., Moore, C., Doe, R. & Ceder, G. Phosphates as lithium-ion battery cathodes: an evaluation based on high-throughput ab initio calculations. Chemistry of Materials 23, 3495-3508 (2011).
Kim, H., Lee, S., Park, Y. U., Kim, H., Kim, J., Jeon, D. & Kang, K. Neutron and X-ray diffraction study of pyrophosphate-based Li2-xMP2O7 (M=Fe, Co) for lithium rechargeable battery electrodes. Chemistry of Materials, 23, 3930-3937 (2011).
Manthiram, A. & Goodenough, J. B. Lithium insertion into Fe2(MO4)3 frameworks: comparison of M = W with M = Mo. Journal of Solid State Chemistry 71, 349-360 (1987).
Manthiram, A. & Goodenough, J. B. Lithium insertion into Fe2(SO4)3 frameworks. Journal of Power Sources 26, 403-408 (1989).
Masquelier, C., Patoux, S., Wurm, C. & Morcrette, M. Chapter 15—Polyanion-based Positive Electrode Materias Lithium Batteries: Science and Technology (eds Nazri, G. & Pistoia, G.) Springer, New York. 445-477 (2003).
Reddy, M. A., Pralong, V., Caignaert, V., Varadaraju, U. V. & Raveau, B. Monoclinic iron hydroxy sulfate: a new route to electrode materials. Electrochemistry Communications 11, 1807- 1810 (2009).
Marx, N., Croguennec, L., Carlier, D., Bourgeois, L., Kubiak, P., Le Cras, F. & Delmas, C. Structrual and electrochemical study of a new crystalline hydrated iron (III) phosphate FePO4.H2O obtained from LiFePO4(OH) by ion exchange. Chemistry of Materials 22(5), 1854-1861 (2010).
Marx, N., Bourgeois, L., Carlier, D., Wattiaux, A., Suard, E., Le Cras, F. & Croguennec, L. Iron (III) phosphates obtained by thermal treatment of the tavorite-type FePO4.H2O material: structures and electrochemical properties in lithium batteries. Inorganic Chemistry 51, 3146-3155 (2012).
Paul, G., Choudhury, A. & Rao, C. N. R. Organically templated linear and layered iron sulfates. Chemistry of Materials 15(5), 1174-1180 (2003).
Rujiwatra, A., Kepert, C. J., Claridge, J. B., Rosseinsky, M. J., Kumagai, H. & Kurmoo, M. Layered cobalt hydroxysulfates with both rigid and flexible organic pillars: synthesis, structure, porosity,

(56) References Cited

OTHER PUBLICATIONS and cooperative magnetism. Journal of the American Chemistry Society 123(43), 10584-10594 (2001).

Cordesen, A. A crystal-structure refinement of libethenite. Canadian Mineralogist 16, 153-157 (1978).

Xiao, F. S., Sun, J., Meng, X., Yu, R., Yuan, H., Xu, J., Song, T., Jiang, D. & Xu, R. Synthesis and structure of copper hydroxyphosphate and its high catalytic activity in hydroxylation of phenol by H2O2. Journal of Catalysis 199, 273-281 (2001).

Xiao, F. S., Sun, J., Meng, X., Yu, R., Yuan, H., Jiang, D., Qiu, S. & Xu, R. A novel catalyst of copper hydroxyphosphate with high activity in wet oxidation of aromatics. Applied Catalysis A: General 207, 267-271 (2001).

Martens, W. & Frost, R. L. An infrared spectroscopic study of the basic copper phosphate minerals: cornetite, libethenite, and psuedomalachite. American Mineralogist 88, 37-46 (2003).

Bridson, J. N., Quinlan, S. E. & Tremain, P. R. Synthesis and crystal structure of maricite and sodium iron (III) hydroxyphosphate. Chemistry of Materials 10(3), 763-768 (1998).

Schmidt, M. & Lutz, H. D. Hydrogen bonding in basic copper salts: a spectroscopic study of malachite, Cu2(OH)2CO3, and brochantite, Cu4(OH)6SO4. Physics and Chemistry of Minerals 20, 27-32 (1993).

Vilminot, S., Richard-Plouet, M., Andre, G., Swierczynski, D., Bouree-Vigneron, F., Marino, E. & Guillot, M. Synthesis, structure and magnetic properties of copper hydroxysulfates. Crystal Engineering 5, 177-186 (2002).

Dutrizac, J. E. & Jambor, J. L. Behaviour of cesium and lithium during the precipitation of jarosite-type compounds. Hydrometallurgy 17, 251-265 (1987).

Cho, I. -., Kim, D. W., Lee, S., Kwak, C. H., Bae, S. -., Noh, J. H., Yoon, S. H., Jung, H. S., Kim, D. -. & Hong, K. S. Synthesis of Cu2PO4OH hierarchical superstructures with photocatalytic activity in visible light. Advanced Functional Materials 18, 2154-2162 (2008).

Xia, C. & Ning, W. A novel bio-electrochemical ascorbic acid sensor modified with Cu4(OH)6SO4 nanorods. Analyst 136(2), 288-292 (Jan. 2011).

Mueller, T.; Hautier, G.; Jain, A.; Ceder, G. Evaluation of tavorite-structured cathode materials for lithium-ion batteries using high-throughput computing. Chemistry of Materials 23, 3854-3862 (2011).

Dutrizac, J. E. & Chen, T. T. Synthesis and properties of V3+ analogues of jarosite-group minerals. The Canadian Mineralogist 41, 479-488 (2003).

Kuang, Q., Xu, J., Zhao, Y., Chen, X. & Chen, L. Layered monophosphate Li9V3(P2O7)3(PO4)2: a novel cathode material for lithium-ion batteries. Electrochimica Acta 56, 2201-2205 (2011).

de Pedro, I., Rojo, J. M., Pizarro, J. L., Fernandez, J. R., Marcos, J. S., Fernandez-Diaz, M. T., Arriortua, M. & Rojo, T. Magnetic evolution of the antiferromagnetic Co2-xCux(OH)PO4 (0<x<2) solid solution. A neutron diffraction study. Journal of Materials Chemistry 17, 3915- 3926 (2007).

Thomas, J. O., Gustafsson, T., Haggstrom, L., Liivat, A., Dahbi, M., Kam, K. C., Ensling, D. & Lo, M. A quantum leap forward for Li-ion battery cathodes. GCEP Final Technical Report, 20 pages, (Aug. 2007-Jul. 2010).

Chan, C. K., Ruffo, R., Hong, S. S., Huggins, R. A. & Cui, Y. Structural and electrochemical study of the reaction of lithium with silicon nanowires. Journal of Power Sources 189, 34-39 (2009).

Chan, C. K., Ruffo, R., Hong, S. S., Huggins, R. A. & Cui, Y. Surface chemistry and solid electrolyte interphase of silicon nanowire anodes in lithium-ion batteries. Journal of Power Sources 189, 1132-1140 (2009).

Gnanavel, M., Pralong, V., Lebedev, O. L, Caignaert, V., Bazin, P. And Raveau., B. Lithium Intercalation into the Jarosite-type Hydroxysulfate: A Topotactic Reversible Reaction from a Crystalline Phase to an Inorganic Polymer-like Structure. Chemistry of Materials 26, 4521-4527 (2014).

\* cited by examiner

TRANSITION METAL HYDROXY-ANION ELECTRODE MATERIALS FOR LITHIUM-ION BATTERY CATHODES

CROSS-REFERENCE TO RELATED APPLICATION APPLICATIONS

This application is a U.S. National Phase Application of International Patent Application No. PCT/US2013/046809 filed Jun. 20, 2013, which the benefit of U.S. Provisional Application Ser. No. 61/662,134 entitled "Transition Metal Hydroxy-Anion Electrode Materials for Lithium-Ion Battery Cathodes" and filed on Jun. 20, 2012, the contents of both of which are incorporated herein by reference in their entirety.

FIELD OF THE INVENTION

This invention relates to transition metal hydroxy-anion electrode materials for lithium-ion battery cathodes.

BACKGROUND

FIG. 1A depicts lithium-ion battery (LIB) 100 having anode 102 and cathode 104. Anode 102 and cathode 104 are separated by separator 106. Anode 102 includes anode collector 108 and anode material 110 in contact with the anode collector. Cathode 104 includes cathode collector 112 and cathode material 114 in contact with the cathode collector. Electrolyte 116 is in contact with anode material 110 and cathode material 114. Anode material 110 and electrolyte 116 are generally known in the art. Anode collector 108 and cathode collector 112 are electrically coupled via closed external circuit 118. Anode material 110 and cathode material 114 are materials into which, and from which, lithium ions 120 can migrate. During insertion (or intercalation) lithium ions move into the electrode (anode or cathode) material. During extraction (or deintercalation), the reverse process, lithium ions move out of the electrode (anode or cathode) material. When a LIB is discharging, lithium ions are extracted from the anode material and inserted into the cathode material. When the cell is charging, lithium ions are extracted from the cathode material and inserted into the anode material. The arrows in FIG. 1A depict movement of lithium ions through separator 106 during charging and discharging. FIG. 1B depicts device 130 including LIB 100. Device 130 may be, for example, an electric vehicle, an electronic device (e.g., a portable electronic device such as a cellular telephone, a tablet or laptop computer, etc.), or the like.

High capacity and high rate LIBs with low cost and improved safety characteristics constitute a major requirement for electric vehicles, portable electronics, and other energy storage applications. Year-to-year electrochemical performance improvements in LIBs are typically limited to 3-4%, with a major bottleneck being the lack of appropriate materials to satisfy the energy and power density requirements. Progress in nanostructured anodes has significantly improved the potential of the practically achievable capacity and rates. For example, high capacity anodes such as silicon, which have been studied since the 1980s, have been found to overcome structural degradation problems through the use of nanowire morphologies. However, batteries utilizing silicon anodes can still only achieve a 30% gain in energy density due to the low capacity of the cathode: current cathodes have practical capacities of 150-180 mAh/g. While nanostructuring of existing cathodes has been found to lead to improvements in usable charge capacity and result in higher rate performance, the theoretical capacities of existing materials is still too low.

SUMMARY

Transition metal hydroxyl anion materials including $M_x(OH)_n(XO_4)_m$, in which M is a transition metal (e.g., Cu, Fe, Mn, Ni, V, Co, Zn, Cr, Mo, and solid solutions thereof), x is the total number of transition metal atoms, and X is S or P (such that the anion is a hydroxysulfate or hydroxyphosphate), are described for use in lithium-ion battery cathodes. These transition metal hydroxysulfate and hydroxyphosphate anions demonstrate improved performance as cathode materials based at least in part on characteristics such as (i) an open framework or layered structure that facilitates fast lithium ion insertion; (ii) beneficial bonding characteristics such as edge-sharing $MO_6$ octahedra for good electronic conductivity and improved rate performance; (iii) flexibility in alkali and transition metal cation incorporation, which can allow for the design of solid-solutions to enhance structural stability, capacity, and reaction potentials; and (iv) possibility for multielectron redox reactions due to the incorporation of more than one transition metal per formula unit, which can result in capacities exceeding 200 mAh/g.

In a first general aspect, an electrode for a lithium-ion battery includes a polyanion material including $M_x(OH)_n(XO_4)_m$, where M is one or more transition metals, x is the total number of transition metal atoms, X is sulfur or phosphorus, and x, n, and m are integers. In a second general aspect, forming an electrode for a lithium-ion battery includes preparing a composition including a polyanion material including $M_x(OH)_n(XO_4)_m$, and contacting the composition with a current collector to form the electrode.

Implementations may include one or more of the following features. The electrode including the polyanion material may be a cathode for a lithium-ion battery. M may be selected from the group consisting of copper, iron, manganese, nickel, vanadium, cobalt, zinc, chromium, molybdenum, and any combination thereof. In some cases, M is a solid solution of two or more transition metals selected from the group consisting of copper, iron, manganese, nickel, vanadium, cobalt, zinc, chromium, and molybdenum. In certain cases, M includes at least two transition metals or x is at least 2. The polyanion material may be a hydroxysulfate or a hydroxyphosphate. The polyanion material may have edge-sharing octahedra and a non-tavorite structure. The polyanion material may include $Li_aM_x(OH)_n(XO_4)_m$, where a is an integer.

In some implementations, a lithium-ion battery includes the electrode of the first general aspect and/or the second general aspect. The lithium-ion battery further includes an anode and an electrolyte in contact with the anode and the cathode, as generally known in the art. In some cases, the lithium-ion battery has a capacity of at least 200 mAh/g. In certain implementations, a device (e.g., an electronic device) includes a lithium-ion battery including the electrode of the first general aspect and/or the second general aspect, or any implementation thereof.

These general and specific aspects may be implemented using a device, system or method, or any combination of devices, systems, or methods. The details of one or more embodiments are set forth in the accompanying drawings and the description below. Other features, objects, and advantages will be apparent from the description and drawings, and from the claims.

DETAILED DESCRIPTION

Figure 1A:
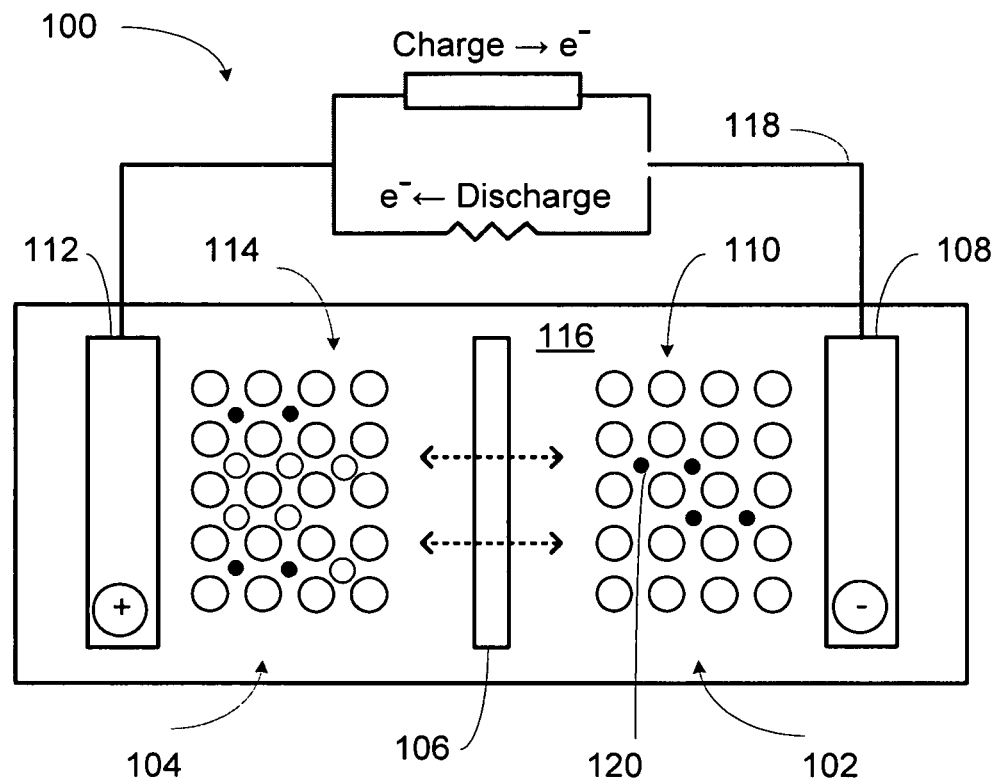
FIG. 1A depicts a lithium-ion battery (LIB).
Figure 1B:
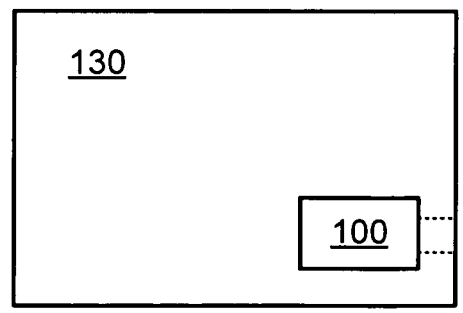
FIG. 1B depicts a device including a LIB.

As described herein, lithium-ion battery (LIB) cathodes including transition metal hydroxyl anion materials having the charge-neutral structure M$_x$(OH)$_n$(XO$_4$)$_m$, in which M is a transition metal (e.g., Cu, Fe, Mn, Ni, V, Co, Zn, Cr, Mo, and solid solutions thereof), X is S or P (such that the anion is a hydroxysulfate or hydroxyphosphate), and x, n, and m are integers provide a desired combination of high charge storage capacity and structural stability. These polyanion materials provide an open framework or layered structure with interstitial spaces that can accommodate lithium ions as well as different transition metals, thereby allowing tuning of redox potentials and capacities. Unlike tavorite hydroxyl anion materials, the metal hydroxysulfate and hydroxyphosphate materials including M$_x$(OH)$_y$(XO$_4$)$_n$ are non-tavorite structures, and thus have edge-sharing rather than corner-sharing octahedra.

Metal hydroxysulfate and hydroxyphosphate materials of the form M$_x$(OH)$_y$(XO$_4$)$_n$ occur in a variety of expanded frameworks and layered structures Examples include Cu$_2$(OH)PO$_4$ (libethenite), Cu$_3$(OH)$_3$PO$_4$ (cornetite) and Cu$_5$(OH)$_4$(PO$_4$)$_2$ (psuedomalachite), Cu$_4$(OH)$_6$SO$_4$ (brochantite), Cu$_3$(OH)$_4$SO$_4$ (antlerite), Cu$_6$(OH)$_{10}$SO$_4$ (montetrisaite), and sodium iron (III) hydroxyphosphate. The synthesis of hydroxysulfate and hydroxyphosphate materials is facilitated by the fact that the compounds can be precipitated from aqueous solutions of the metal salts or synthesized using hydrothermal methods. For example, the copper hydroxyphosphate libethenite is generally understood to be formed by mixing Cu(NO$_3$)$_2$ and (NH$_4$)$_2$HPO$_4$ and precipitating in acidic solutions; the copper hydroxysulfate brochantite are generally understood to be synthesized by refluxing CuCl$_2$ in NH$_4$SO$_4$ and NaOH. Copper hydroxysulfates and hydroxyphosphates can also be obtained by hydrothermal reaction of CuSO$_4$ in NaOH or H$_3$PO$_4$, respectively. The antlerite and brochantite compositions can be obtained by changing the Cu/NaOH/H$_2$O molar proportions. When these materials are synthesized in nanoparticle form, the resulting nanostructured morphology is believed to improve electrochemical performance due at least in part to the decreased distance required for electronic transport and lithium ion diffusion.

In one example, Cu$_2$(OH)PO$_4$, the mineral libethenite, includes PO$_4$ tetrahedra, CuO$_4$(OH) trigonal bipyramids, CuO$_4$(OH)$_2$ octahedra, and OH groups linking the two Cu species. The structure has chains of edge-sharing CuO$_4$(OH)$_2$ octahedra parallel to the c-axis, but no P—O—P chains, which imparts good electronic conductivity. As described herein, Cu$_2$(OH)PO$_4$ displays electrochemical activity and can reversibly intercalate Li$^+$ ions. The theoretical capacity based on the Cu$^{2+/1+}$ couple is 224 mAh/g, which is significantly higher than the ~150 mAh/g observed for LiCoO$_2$ and LiMn$_2$O$_4$ and the 120-170 mAh/g for other polyanion cathodes (e.g., LiFePO$_4$, LiFeSO$_4$F). The higher capacity is understood to be due to the presence of two transition metal ions per formula unit, resulting in the 2e$^-$ process:

Cu$_2$(OH)PO$_4$+2e$^-$+2Li$^+$→Li$_2$Cu$_2$(OH)PO$_4$.

For reduction of the Cu$^{2+}$ to Cu$^0$, as in a conversion reaction, the theoretical capacities (for the 4e$^-$ process) would increase to 448 mAh/g. In some cases, lithiated materials having the structure Li$_q$M$_x$(OH)$_n$(XO$_4$)$_m$ as described herein may be synthesized directly.

While libethenite does not contain alkali ions in its initial state, there are other hydroxyphosphate materials that are found in nature already with alkali ions incorporated. For example, sodium iron hydroxyphosphate (SIHP) has a formula Na$_3$Fe(PO$_4$)$_2$·Na$_{2(1-x)}$H$_{2x}$O, where 0.2<x<0.4. The structure has Fe—O—Fe chains with two phosphates linking adjacent iron atoms. The bridging hydroxyl groups can associate with H$^+$ or Na$^+$ cations, which are located in the relatively open channels of the phosphate lattice. Thus, this structure has the Fe—O—Fe bonding required for good electronic conductivity, in addition to the Fe—O—X—O—Fe (where X=PO$_4$) bonding which will promote higher voltages. The open channels may also promote good diffusion of Na$^+$ ions.

Hydroxysulfate materials also display interesting structures that may promote high electronic and ionic conductivities. For example, the Cu hydroxysulfate family consists of edge-shared Cu octahedra that form layers. These layered structures may promote the fast insertion/deinsertion of Li$^+$. The theoretical capacities for Cu$_3$(OH)$_4$SO$_4$ (antlerite), Cu$_4$(OH)$_6$SO$_4$ (brochantite), and Cu$_6$(OH)$_{10}$SO$_4$ (montetrisaite) for the 3, 4, and 6 electron reduction processes are 227, 237, and 248 mAh/g, respectively. As with the hydroxyphosphates, some iron hydroxysulfates exist already containing alkali metals. For example, solid solutions of the form Li$_x$K$_{1-x}$Fe$_3$(OH)$_6$(SO$_4$)$_2$, similar to the mineral jarosite (MFe$_3$(OH)$_6$(SO$_4$)$_2$, with M=Na, K, Rb, NH$_4$, Ag), have been observed.

The selection of related hydroxyanion materials that may be electrochemically active can be guided by the typical redox potentials of transition metals used in cathode materials for LIBs, such as the Cu$^{2+/1+}$, Fe$^{3+/2+}$, and Mn$^{3+/2+}$, V$^{4+/3+}$, and Co$^{3+/2+}$ redox couples, as well as the existence of stable compositions and structures from mineralogy. Because these materials are based on naturally occurring minerals, the oxidation states of the transition metals are typically in the commonly found +2 valence. For example, there are Mn$^{2+}$ and Ni$^{2+}$ hydroxysulfate analogs to the copper-containing libethenite, cornetite, etc., which may be suitable cathode materials for LIBs under conditions in which the M$^{3+/2+}$ couple is accessible. A lithiated jarosite of the form LiFe$_3$(OH)$_6$(SO$_4$)$_2$ may be delithiated upon oxidation to Fe$^{4+}$. The V$^{3+}$ analog of jarosite is expected to have advantageous electrochemical properties, since the V$^{4+/3+}$ and V$^{5+/4+}$ couples are thought to be electrochemically accessible.

These hydroxyanion materials may be made into solid solutions or mixed metal compounds, which can further affect the structural stability and voltage characteristics. For example, $Cu^{2+}Fe^{3+}(OH)(SO_4)_2 \cdot 4H_2O$ is known to exist as the mineral guildite, and the solid solution $Co_{2-x}Cu_x(OH)PO_4$ has been made synthetically. The presence of multiple transition metals has been shown to modify the structure or improve Li diffusivity in other polyanion systems without being redox active (known as the bystander effect), suggesting that the electrochemical properties of these solid solutions may be tunable to achieve optimal voltage and capacity.

Another attractive feature of polyanion materials is that because the anions are larger than $O^{2-}$, they can be more easily found in a variety of open framework structures that can facilitate the diffusion of $Li^+$, and perhaps even larger cations such as $Na^+$, $Mg^{2+}$, and $Ca^{2+}$. This may also impart an improved structural stability during cation de-intercalation. However, the heavier weight of the oxyanion lowers the gravimetric capacity, necessitating the use of multi-electron redox processes.

As described herein, hydroxysulfate and hydroxyphosphate materials having edge-sharing (not corner-sharing) octahedra offer a flexible and tunable platform, in terms of composition and structure, having open framework or layered structures with space for lithium ions to intercalate. The structural tunability as well as unique bonding can offer improved electronic and ionic conductivities compared to other polyanion materials, which can affect the charge/discharge rates and power capabilities. Also, the presence of multiple transition metals per formula unit facilitates multi-electron redox reactions, which can lead to high capacity cathode materials.

EXAMPLES

Example 1

Figure 2A:
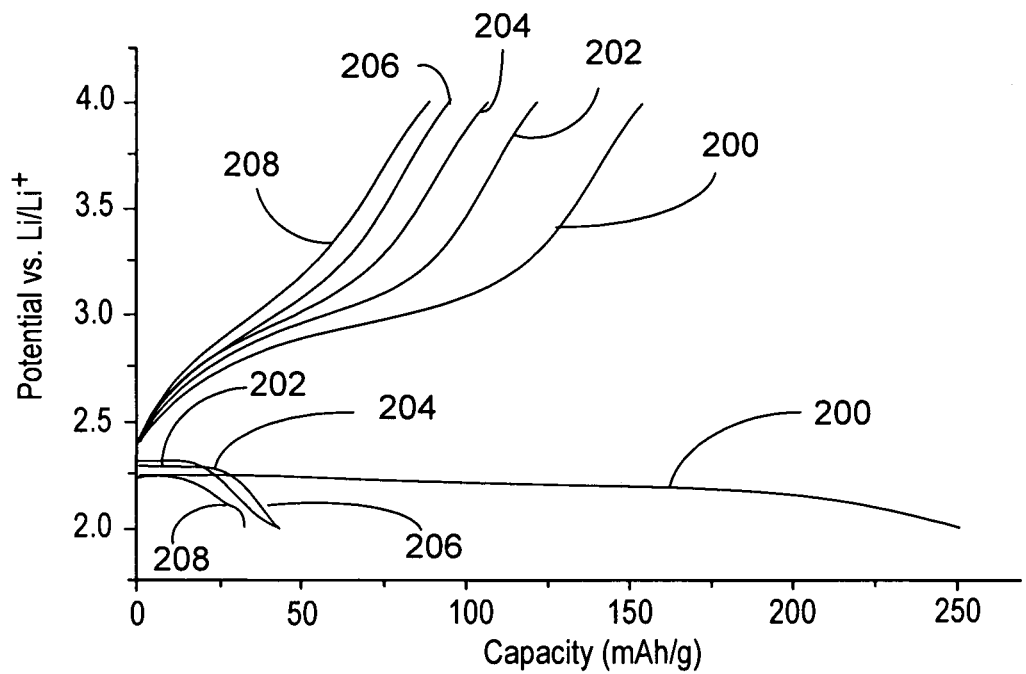
FIG. 2A shows plots of potential (vs. Li/Li$^+$) versus capacity (mAh/g) for the reaction of Cu$_2$(OH)PO$_4$ (libethenite) with lithium as described in Example 1.
Figure 2B:
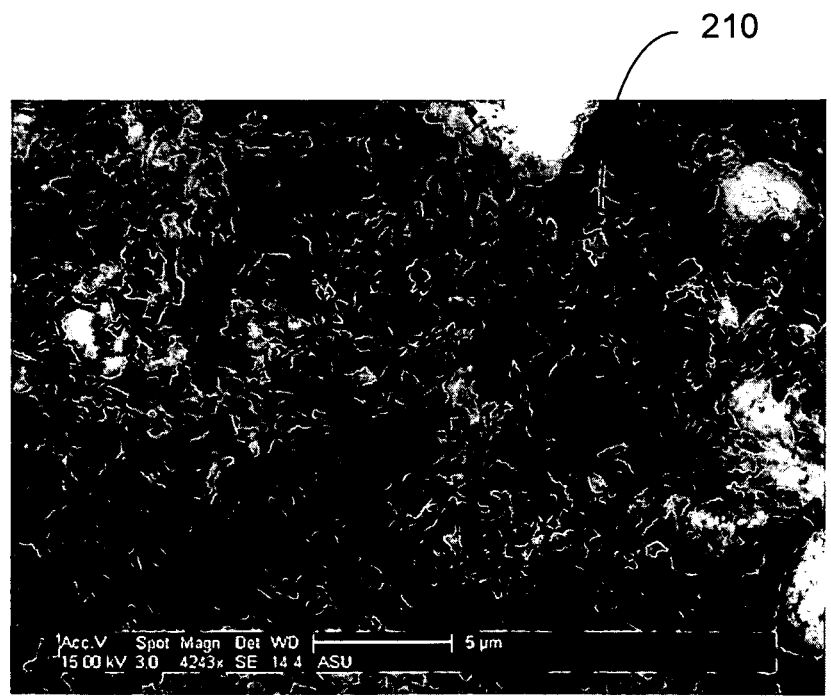
FIG. 2B shows a scanning electron microscope (SEM) image of Cu$_2$(OH)PO$_4$ nanorods.
Figure 2C:
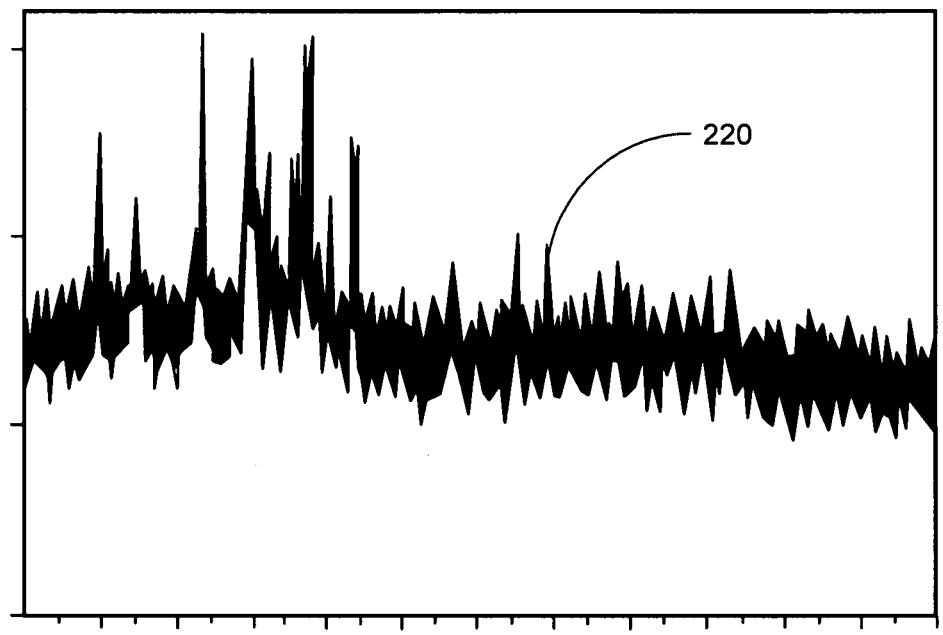
FIG. 2C shows an X-ray diffraction pattern of Cu$_2$(OH)PO$_4$ nanorods.

A LIB cathode was prepared by mixing commercially available $Cu_2(OH)PO_4$ powder (Sigma Aldrich) with 10 wt % carbon black and 10 wt % polyvinylidene difluoride (PVDF) binder in a slurry with N-methyl pyrrolidone as solvent, then coating as a film onto aluminum foil current collectors using a Meyer rod. A LIB was formed with a lithium metal anode and an electrolyte of 1 M $LiPF_6$ in 1:1 ethylene carbonate: diethylcarbonate. Charge/discharge curves 200, 202, 204, 206, and 208 from five consecutive cycles with the LIB are show in FIG. 2A, with the upper and lower portion of each plot corresponding to charge and discharge curves, respectively. As shown in FIG. 2A, $Cu_2(OH)PO_4$ was found to be electrochemically active and capable of reversibly intercalating lithium. FIG. 2B is a scanning electron microscope (SEM) image of the $Cu_2(OH)PO_4$ nanorods 210 used to form the LIB cathode of this example. The nanorods are generally 1-2 μm in length and 100-200 nm in diameter. FIG. 2C shows an X-ray diffraction pattern 220 of the $Cu_2(OH)PO_4$ nanorods.

Example 2

Figure 3A:
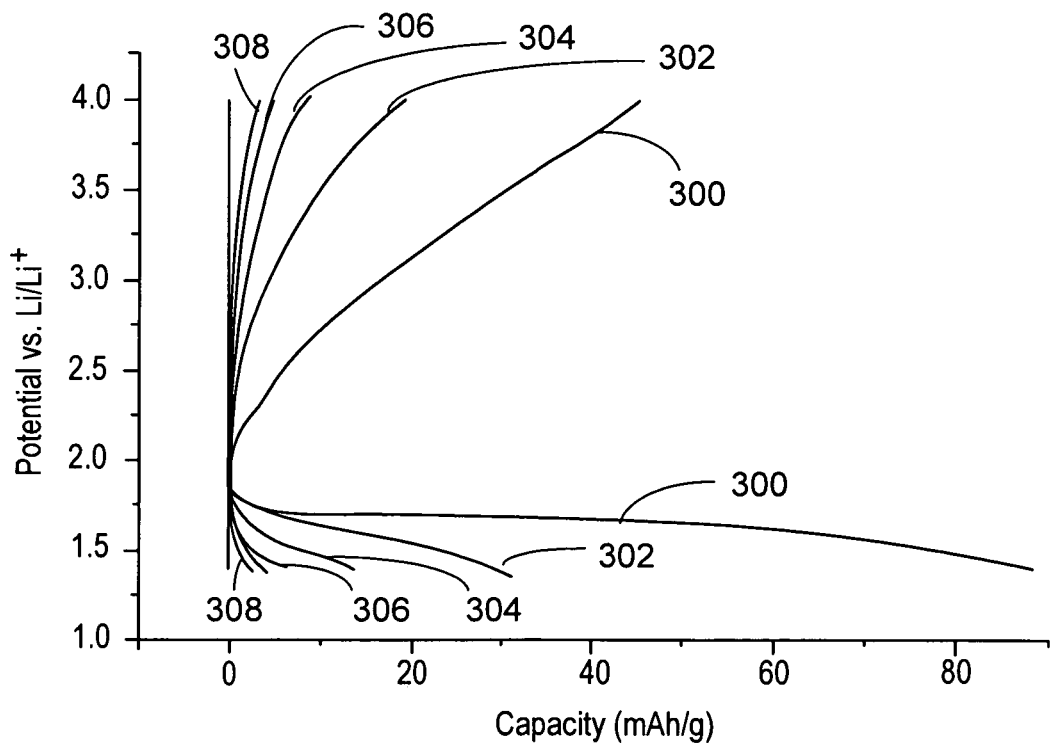
FIG. 3A shows plots of potential (vs. Li/Li$^+$) versus capacity (mAh/g) for the reaction of Cu$_4$(OH)$_6$SO$_4$ (brochantite) with lithium as described in Example 2.
Figure 3B:
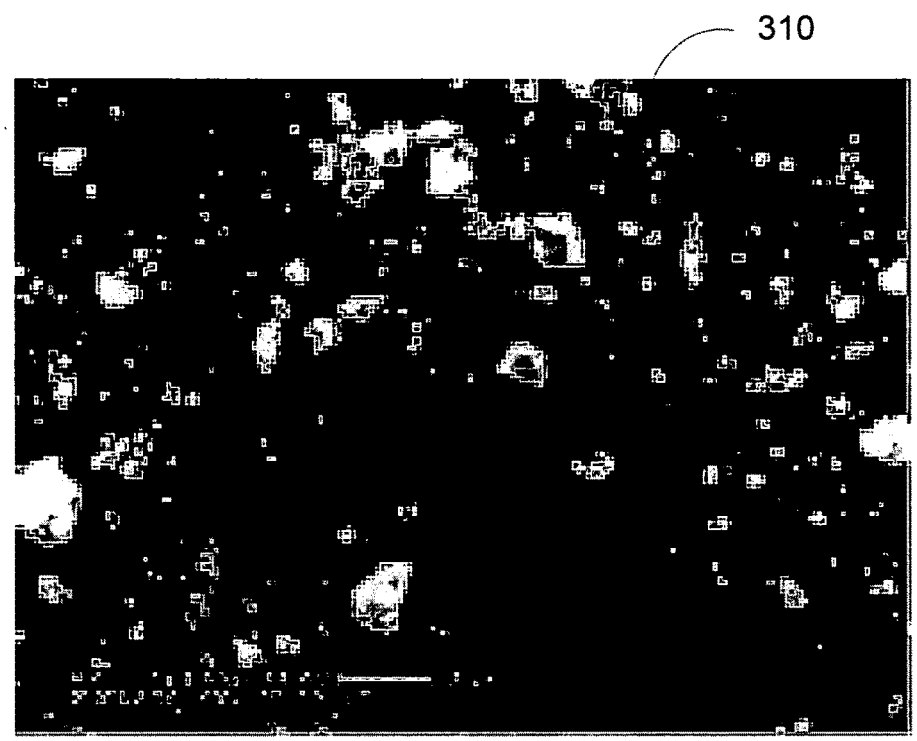
FIG. 3B shows an SEM image of Cu$_4$(OH)$_6$SO$_4$ particles.
Figure 3C:
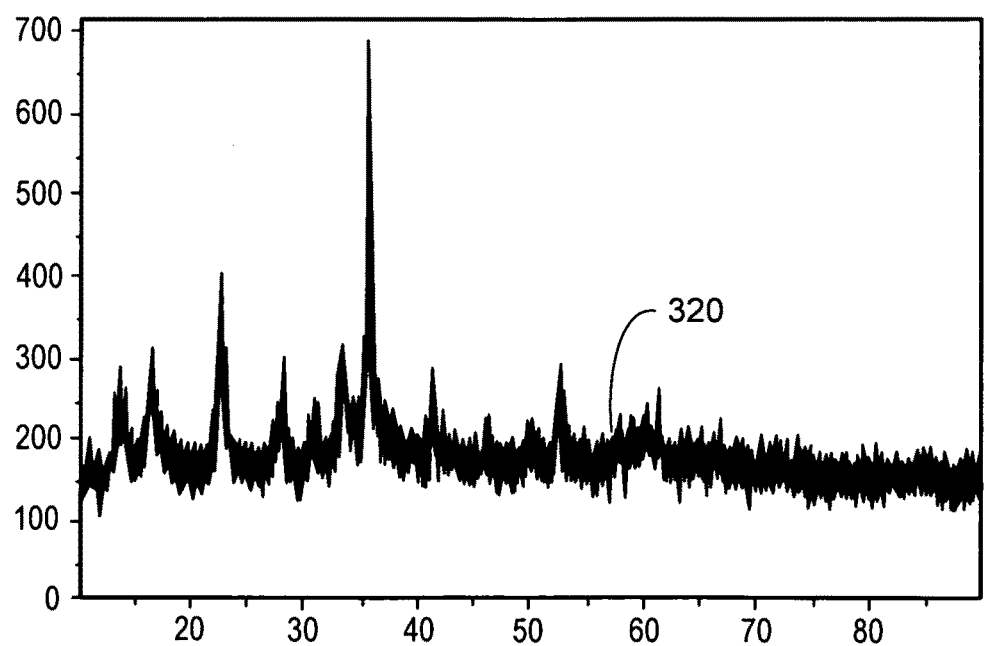
FIG. 3C shows an X-ray diffraction pattern. Cu$_4$(OH)$_6$SO$_4$ particles.

Brochantite was synthesized using titration of 0.1 M NaOH into $CuSO_4$ of the same concentration, yielding particles in a range of 1-20 μm. A LIB was formed with a lithium metal anode and an electrolyte of 1 M $LiPF_6$ in 1:1 ethylene carbonate: diethylcarbonate. Charge/discharge curves 300, 302, 304, 306, and 308 from five consecutive cycles with the LIB are show in FIG. 3A, with the upper and lower portion of each plot corresponding to charge and discharge curves, respectively. As shown in FIG. 3A, this material was found to be electrochemically active and capable of reversibly intercalating lithium. The large particle sizes may be responsible for the lower observed capacities than expected theoretically and the capacity fade with subsequent cycling. However, it is believed that this can be improved through nanostructuring the material. FIG. 3B shows an SEM image of the $Cu_4(OH)_6SO_4$ particles 310 used to form the LIB in this example. FIG. 3C shows an X-ray diffraction pattern 320 of $Cu_4(OH)_6SO_4$ particles.

A number of embodiments of the invention have been described. Nevertheless, it will be understood that various modifications may be made without departing from the spirit and scope of the invention. Accordingly, other embodiments are within the scope of the following claims.

What is claimed is:

1. An electrode for a lithium-ion battery, the electrode comprising a polyanion material including $M_x(OH)_n(XO_4)_m$, wherein M is one or more transition metals, x is the total number of transition metal atoms, X is sulfur or phosphorus, and x, n, and m are integers, and wherein the polyanion material has a non-tavorite structure.

2. The electrode of claim 1, wherein the electrode comprising the polyanion material is a cathode.

3. The electrode of claim 1, wherein M is selected from the group consisting of copper, iron, manganese, nickel, vanadium, cobalt, zinc, chromium, molybdenum, and any combination thereof.

4. The electrode of claim 3, wherein M is a solid solution of two or more transition metals selected from the group consisting of copper, iron, manganese, nickel, vanadium, cobalt, zinc, chromium, and molybdenum.

5. The electrode of claim 1, wherein M includes at least two transition metals or x is at least 2.

6. The electrode of claim 1, wherein the lithium-ion battery has a capacity of at least 200 mAh/g.

7. The electrode of claim 1, wherein the polyanion material is a hydroxysulfate.

8. The electrode of claim 1, wherein the polyanion material is a hydroxyphosphate.

9. The electrode of claim 1, wherein the polyanion material comprises edge-sharing octahedra.

10. The electrode of claim 1, wherein the polyanion material includes $Li_aM_x(OH)_n(XO_4)_m$, and a is an integer.

11. A lithium-ion battery comprising the electrode of claim 1.

12. The lithium-ion battery of claim 11, wherein the electrode of claim 1 is a cathode, and further comprising an anode and an electrolyte in contact with the anode and the cathode.

13. A device comprising the lithium-ion battery of claim 11.

14. A method of forming an electrode for a lithium-ion battery, the method comprising:
    preparing a composition comprising a polyanion material including $M_x(OH)_n(XO_4)_m$, wherein M is one or more transition metals, x is the total number of transition metal atoms, X is sulfur or phosphorus, and x, n, and m are integers, wherein the polyanion material has a non-tavorite structure; and
    disposing the composition on a current collector to form the electrode.

15. The method of claim 14, wherein the polyanion material includes $Li_aM_x(OH)_n(XO_4)_m$, wherein a is an integer.

16. The method of claim 15, wherein M is selected from the group consisting of copper, iron, manganese, nickel, vanadium, cobalt, zinc, chromium, molybdenum, and any combination thereof.

17. The method of claim 16, wherein M is a solid solution of two or more transition metals selected from the group consisting of copper, iron, manganese, nickel, vanadium, cobalt, zinc, chromium, and molybdenum.

18. The method of claim 14, wherein M includes at least two transition metals or x is at least 2.

19. The method of claim 14, wherein the polyanion material comprises edge-sharing octahedra.

20. An electrode for a lithium-ion battery formed by the method of claim 14.

21. A lithium-ion battery comprising the electrode formed by the method of claim 14.

22. A device comprising the lithium-ion battery of claim 21.

* * * * *